(12) United States Patent
Coulbourn, Jr.

(10) Patent No.: US 8,176,954 B1
(45) Date of Patent: May 15, 2012

(54) NONBINDING TREE HARVESTING APPARATUS AND METHOD

(76) Inventor: Edwin T. Coulbourn, Jr., Manteo, NC (US)

( * ) Notice: Subject to any disclaimer, the term of this patent is extended or adjusted under 35 U.S.C. 154(b) by 34 days.

(21) Appl. No.: 12/074,537

(22) Filed: Mar. 5, 2008

(51) Int. Cl.
*A01G 23/08* (2006.01)

(52) U.S. Cl. .......................... 144/4.1; 144/34.1

(58) Field of Classification Search ............ 144/4.1, 144/34.1, 34.5, 24.13; 83/77
See application file for complete search history.

(56) References Cited

U.S. PATENT DOCUMENTS

| | | | | |
|---|---|---|---|---|
| 3,294,131 A | * | 12/1966 | Larson | 144/34.5 |
| 3,461,928 A | * | 8/1969 | Siiro | 144/4.1 |
| 3,532,141 A | | 10/1970 | Kamner | |
| 3,536,113 A | | 10/1970 | Sutherland | |
| 3,563,288 A | * | 2/1971 | Brownell | 144/338 |
| 3,604,479 A | * | 9/1971 | Jordan | 144/34.1 |
| 3,990,584 A | * | 11/1976 | Strawson et al. | 212/278 |
| 3,993,166 A | * | 11/1976 | Senour | 187/223 |
| 4,269,241 A | | 5/1981 | Hickman | |
| 4,456,093 A | * | 6/1984 | Finley et al. | 182/2.2 |
| 4,746,024 A | * | 5/1988 | Hensler | 212/283 |
| 5,377,730 A | * | 1/1995 | Hamilton | 144/4.1 |
| 5,429,163 A | * | 7/1995 | Frenkel et al. | 144/364 |
| 5,709,254 A | * | 1/1998 | Argue | 144/34.1 |
| 5,975,166 A | * | 11/1999 | MacLennan | 144/4.1 |
| 6,123,124 A | | 9/2000 | Naud | |
| 6,408,906 B1 | | 6/2002 | Moon | |
| 7,086,435 B1 | | 8/2006 | Coulbourn | |
| 2004/0250908 A1 | * | 12/2004 | Hicks | 144/335 |

\* cited by examiner

*Primary Examiner* — Shelley Self
(74) *Attorney, Agent, or Firm* — J. Bowen Ross, Jr.

(57) ABSTRACT

The tree harvesting apparatus and method of this invention are particularly useful in congested areas where the range of equipment movement is limited and where unrestrained heavy tree bolts would cause damage to surrounding property if allowed to free fall to the ground. The subject apparatus is adapted to engage and sever large tree limbs, tree tops and tree bolts from free standing trees by means of tree gripping and severing means which is operable to form a kerf without becoming bound within the same. Further, the subject apparatus is adapted to weigh a tree bolt or tree top immediately upon its formation and while in juxtaposition with the free standing tree.

8 Claims, 6 Drawing Sheets

NONBINDING TREE HARVESTING APPARATUS AND METHOD

FIELD OF THE INVENTION

This invention relates to a tree harvesting apparatus and method and, more particularly, to an improved tree severing mechanism which includes an anti-binding tree cutting means and a tree bolt weighing means.

BACKGROUND OF THE INVENTION

This invention is an improvement on this inventor's prior U.S. Pat. No. 7,086,435 B1. Also, other teachings of tree harvesting, cutting and gripping apparatus mounted on the end of an adjustable boom are illustrated in U.S. Pat. Nos. 6,408,906 B1; 3,532,141; 3,536,113; 4,269,241 and 6,123,124.

For some years, tree severing mechanisms or felling heads have been mounted on the end of extendable booms which are operable from a motorized vehicle, something similar to a "cherry picker". These vehicles are maneuverable and can negotiate in very limited space. These manipulated felling heads cause much less damage to the surrounding environment or structures. The felled tree bolts are not allowed to drop to the ground or be dragged along the forest floor, crushing and uprooting young saplings, much less being allowed to flatten someone's dwelling.

The first tree harvesters merely severed the tree at its base and allowed it to fall without thought as to direction or damage. Then, loggers began to ascend trees delimbing as they went. Direction to tree fall was supplied by tying a rope or line to the top of the tree and pulling the same by hand or tractor in a preferred direction while being severed at the tree base. The third harvesting practice was the use of a crane supporting a platform for a tree climber wielding a chain saw to trim limbs and cut short tree bolts.

Most of today's tree harvesting of this type occurs in congested area, such as housing developments, where movement in confined areas is critical. Thus, the cut tree top or other cut tree bolts cannot be released and allowed to free fall to the ground and risk damaging structures, power lines and prized fruit trees. Therefore, the cut portion must be lowered to the ground while still in the grasp of the machine. Since trees vary in size and weight, risks are taken on some occasion when the actual weight of the cut portion of the tree is so heavy as to overload the boom and cause the entire mechanized unit to tip over.

The monitoring and measuring the weight of a fixed load on a boom end or forklift has been taught by U.S. Pat. Nos. 3,990,584; 3,993,166; 4,456,093 and 4,746,024 which are hereby incorporated by reference. In U.S. Pat. No. 7,086,435 B1, the inventor (who is the same as the subject inventor) taught a weighing means for a severed tree bolt which was an improvement over the art at that time but not accurate enough for some critical applications. The objection is that calculating the weight of an object on the end of an extended boom is affected by the rigidity of the extended boom, wind pressure acting on the boom and cut tree bolt section and the stability of the base machine platform from which it extends. Any bobbing up and down by the weighted object will cause fluctuations in the measurements which may already exceed the limits of reliability for safety purposes. Also, an over-the-limit weighing tree top or bolt once removed from the free standing tree could topple over the support vehicle and releasing the tree top once the toppling movement had begun would be too late to rectify the situation.

Of particular concern in the cutting of free standing trees or large limbs extending therefrom is the binding of the saw blade while passing through the tree forming the kerf, the kerf being the incision made in the tree by the saw blade. As the kerf is being formed, the tree due to gravity or a spring load within the tree itself will tend to close the kerf thus impinging upon the saw blade and preventing any further saw blade movement. Upon such an occurrence, moving parts such as the saw blade chain may shear and separate with considerable force. Thus, not only will the saw blade chain disintegrate sending out shrapnel in all directions endangering those around but also will completely interrupt and bring to a standstill all cutting operations. Those familiar with any woodworking operation is appreciative of the consequences resulting from the binding of a cutting saw blade while still in the kerf.

The motorized vehicle with the extendable boom is made by Manitou North America, Inc. of Waco, Tex., and is well known in the trade. The Manitou Model MRT 2150 and other similar devices incorporate a computerized system for measuring and displaying the weight of a load of construction material placed on a forklift mounted on the end of a boom. The turntable on which the boom of the Manitou apparatus is situated can rotate 360 degrees. The end of the boom upon which the subject tree severing mechanism is mounted can be lowered to essentially ground level or be raised to a height of at least 80 feet. The Manitou apparatus also has means for measuring and displaying the height at which the end of the boom is located and imputing that height as a signal to a computer. Further, this apparatus has means for measuring and displaying the horizontal distance between the center of the boom turntable and the projected location of the tree severing apparatus measured on the horizontal plane passing through the base of the boom. A signal representing this distance is also imputed to the Manitou apparatus computer as one factor in helping determine the likelihood of the Manitou apparatus tipping over when the boom end is at a particular height, angle and is carrying a particular load.

In the prior art, many different types of mechanisms have been used to create the side to side tilting motion of the felling head. Some systems use a pair of hydraulic actuators mounted on the felling head to achieve the tilting motion. However, these prior art arrangements tend to be bulky, heavy and expose certain moving part to the rigorous environment of the logging industry.

Thus, a principal object of this invention is to provide a tree harvesting apparatus and method for general use but particularly adapted for use in a crowded suburban or business area. This apparatus enables a tree top or cut log bolt being harvested to be gripped and weighed prior to being lowered or allowed to free fall to the ground.

Another primary object of this invention is to provide means for grasping a standing tree in a manner that will allow the cutting means, i.e., chain saw or rotation blade, to form a kerf in the tree that will not bind the cutting means.

Another object of this invention is to provide a tree cutting head mounted on an extending boom that is rotatable in both a plane being horizontal to the ground or base area and in a plane being perpendicular to the ground through a 180 degree arc in each plane.

Other objects and features of this invention will become apparent by reference to the following drawings and description.

SUMMARY OF THE INVENTION

According to this invention, a tree harvesting apparatus (and method) is provided with at least three sets of tree gripping arms and a tree cutting mechanism located between the middle and lower sets of gripping arms (counting from the top). This tree gripping and cutting mechanism sequentially cuts the tree tip and the log bolts as the mechanism descends down the tree stem. After each cut, beginning with the tree top, the mechanism which is mounted at the end of an extendable boom lowers the firmly grasped cut bolt to the ground in an orderly fashion. When the tree harvesting operation is being carried out in a congested area where the weight of the cut bolt could cause a tipping problem, this invention enables the tree bolt to be weighed virtually in situ after being cut and the measured weight is used as a basis for deciding whether to allow the bolt to free fall or be lowered to the ground. That is, if the bolt weight is excessive and could cause a vehicle tipping problem, the tree gripping arms are immediately released and the tree bolt falls harmlessly to the ground. Any decision to release the tree bolt when not being supported by the free standing tree stem would be too late for the vehicle tipping motion would already be in progress.

The weighing means of this invention requires that a kerf be formed in the free standing tree by the severing means (chain saw) while pairs of gripping arms engage the tree on both sides of the kerfs to prevent any movement by the tree. Once the kerf is formed in the tree, the tree's upper or cut bolt portion is suspended in space the width of the kerf above the uncut or free standing portion of the tree. The preferred embodiment provided two pairs of gripping arms to secure the cut portion or tree bolt. The use of only one pair of gripping arms in the area above the kerf could not restrain the cut bolt from reacting to a torque applied to the tree bolt from wind, gravity or some other means. While the cut bolt is suspended, the free standing tree and the cut tree bolt are securely in the grasp of the engaging pairs of gripping arms, i.e., the two upper pairs of gripping arms secure the cut bolt above the free standing tree the distance of the formed kerf while the lower pair of gripping arms securely grasp the free standing tree. A strain gauge is placed across the kerf and an accurate weight measurement is obtained while the cut bolt and free standing tree are still in alignment and while no external forces, such as wind, are allowed to act upon the total mechanism.

The tree gripping and severing mechanism which is mounted on the end of an extendable boom must be rotatable in two perpendicular planes to be effective. The rotation through the vertical plane is provided by a hydraulic piston and cylinder combination which is common in the art. However, the rotation of the gripping and severing mechanism about a horizontally aligned axis is not so easily achieved. Torque must be provided to the gripping and severing mechanism to rotate the same about an axis which is generally parallel to the ground. Such torque is provided by two sets of hydraulic systems, the first hydraulic system connecting the stationary post extending from the boom end to a rotatable cylinder attached to the stationary boom end by means of a first bearing and a second hydraulic systems having one end being attached to the rotatable cylinder and the other end being connected to the gripping and severing means mounting shaft. The gripping and severing means mounting shaft is rotatably mounted in the rotatable cylinder by means of a second bearing. In summary, the gripping and severing means mounting shaft may be rotated about the axis generally parallel to the ground through an arc of at least 180 degrees in order that the gripping means may grasp either the main tree trunk or any limb extending outwardly therefrom. This rotation is accomplished by having the first hydraulic system rotate the cylinder at least 90 degrees and by having the second hydraulic means rotate the gripping means mounting shaft an additional 90 degrees relative to the cylinder. Thus, by engaging sequentially the first and second hydraulic systems, the gripping and severing means mounting shaft is rotated 180 degrees relative to the stationary head.

Figure 8:
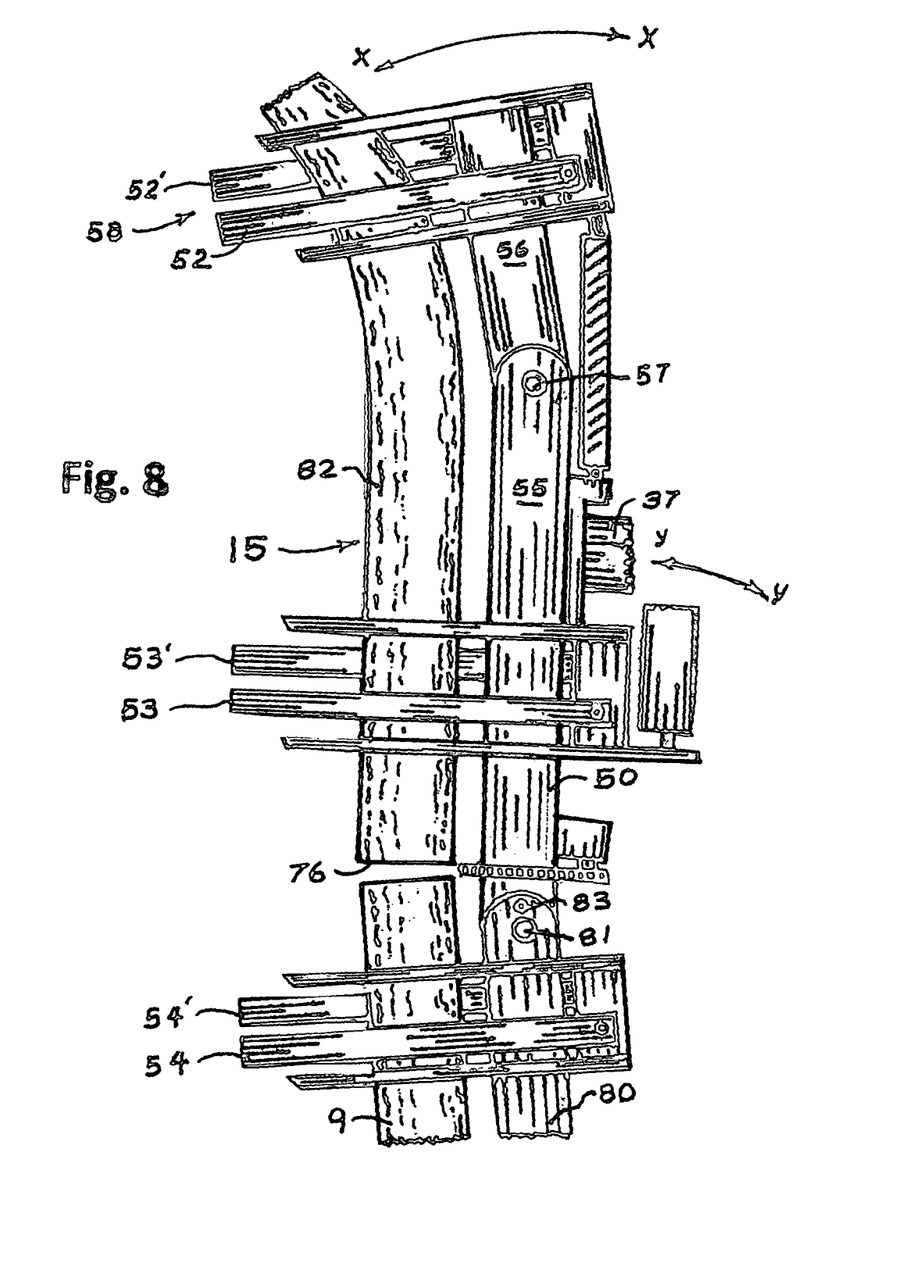
FIG. 8 is an elevation view of the tree gripping and severing mechanism showing the upper tree gripping arms grasping an irregular tree bolt and showing a lateral force being exerted on the tree bolt to maintain separation in the kerf.

An additional embodiment of this invention is shown in FIG. 8. With the lower pair of gripping arms firmly clutching the tree, the kerf is slightly opened by applying a lateral and pivoting motion to the tree bolt being cut and which is held by the middle and upper pairs of gripping arms. Such maneuver is accomplished by severing the backbone post at a location beneath the saw blade forming upper and lower backbone parts which are then joined by a pivot pin. This junction allows the two upper pairs of gripping arms to pivot relative the lower gripping arms and prevent the cut bolt from collapsing on the free standing tree and binding the saw blade.

Another advantage of this embodiment is that the pivot pin can be withdrawn to allow the lower gripping arms and lower backbone part to be removed from the apparatus. Thus, the last cut of the tree can be proximate ground level. Also, without the lower gripping arms being present, smaller tree limbs can be removed from the free standing tree prior to the tree tip and tree bolts being cut.

DETAILED DESCRIPTION OF THE PREFERRED EMBODIMENT

Figure 1:
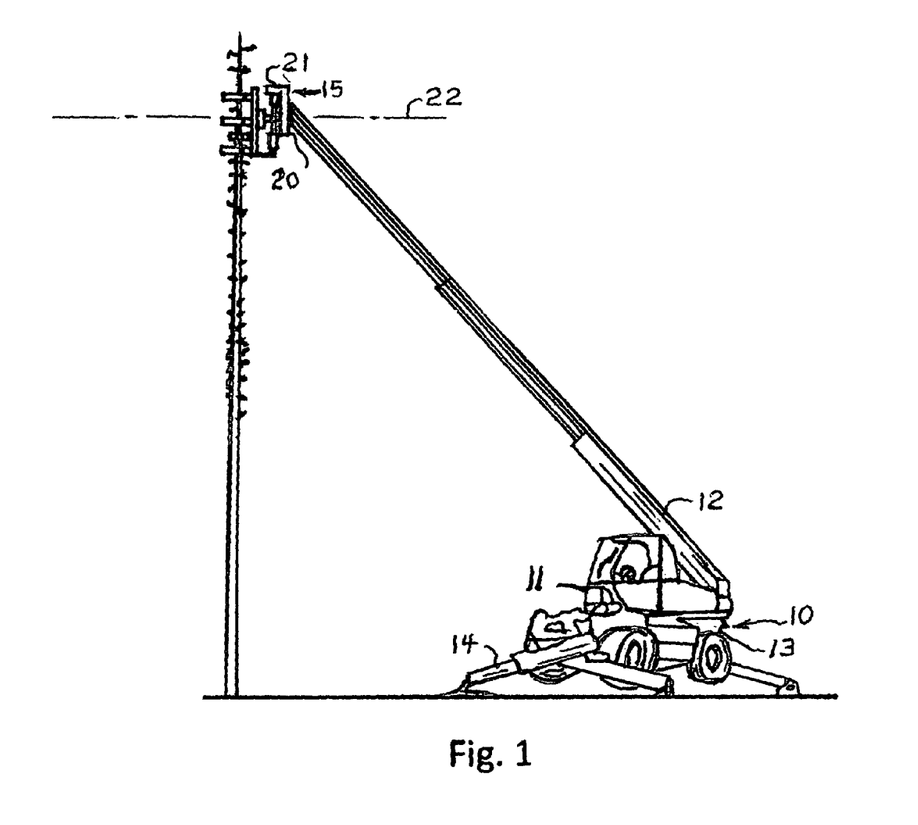
FIG. 1 is a side view illustrating the tree harvesting apparatus of this invention being mounted on the end of a telescoping boom extending outwardly from a land traversing vehicle and being clamped to the free standing tree preparatory to its top being cut.

With reference initially to FIG. 1 and using the Manitou MRT 2150 as a model (other "cherry picker" crane type vehicles can be used), this invention incorporates a vehicle 10 having a cab 11 and extendable boom 12 mounted on turntable 13 which can rotate through an arc of 360 degrees. Turntable 13 is stabilized by means of adjustable outriggers 14 which are used to secure and level vehicle 10 prior to the use of boom 12. While the end of boom 12 may be adaptable to receive other mechanisms, for example a conventional delimbing apparatus, its primary purpose in accordance with this invention is to receive tree gripping and severing mechanism 15.

Figures 2, 3:
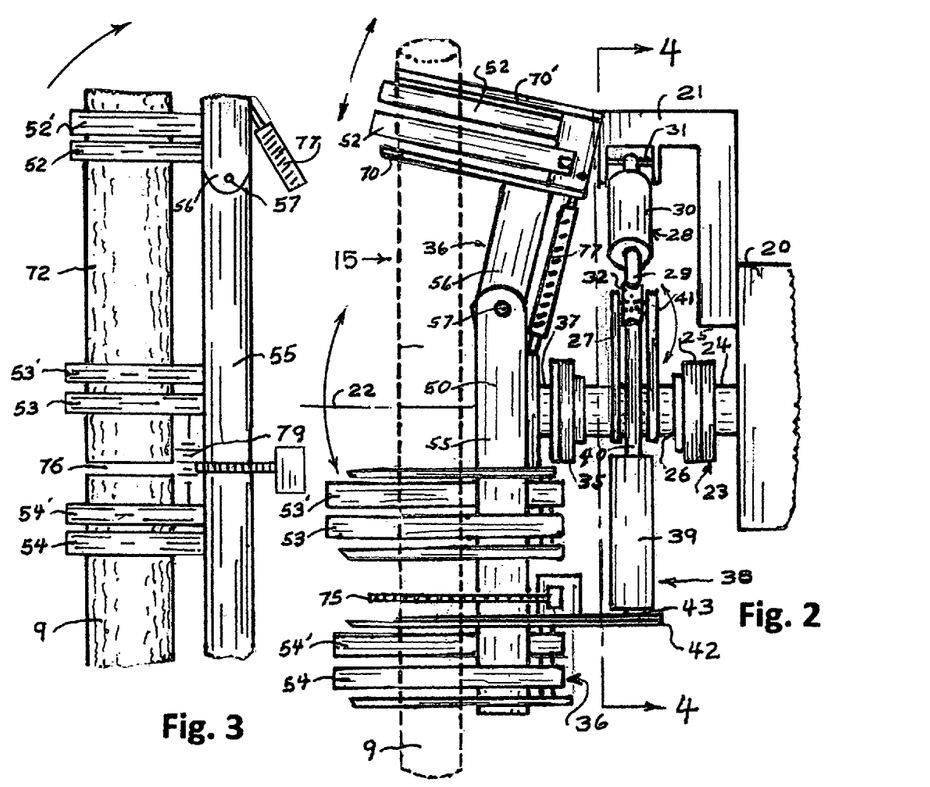
FIG. 2 is a side enlarged view of the tree harvesting apparatus being attached to a free standing tree and in a position to cut a tree bolt.
FIG. 3 is a partial side elevation view of the tree harvesting apparatus showing the gripping arms securing both the cut bolt and the free standing tree to the mounting shaft.

Tree gripping and severing mechanism 15 is attached to boom end 20 as well as post 21 is stationarily mounted. In other words, all working parts of tree gripping and severing mechanism 15 rotate about axis 22 which extends outwardly along a horizontal plane from boom end 20. Extending along said axis 22 (see FIG. 2) is multifaceted cylinder 23 rigidly attached to boom end 20 by means of anchor cylinder 24. First cylinder bearing 25 is mounted on anchor cylinder 24 and is operable to rotate in a plane perpendicular to axis 22 and parallel to the front plane of boom end 20. Rigidly united to first cylinder 25 is axially extending piston actuated cylinder 26. Cylinder lever 27 is rigidly mounted on piston actuated cylinder 26 such that any movement imparted to cylinder lever 27 will result in a likewise movement in piston actuated cylinder 26. Hydraulic piston-cylinder arrangement 28 is comprised of hydraulic piston 29 and hydraulic cylinder 30 which are respectively connected to post 21 by means of pin 31 and to cylinder lever 27 by rotatable coupling 32. Thus, upon energizing first hydraulic piston-cylinder arrangement 28, hydraulic piston 29 is either forced into or out of hydraulic cylinder 30 causing cylinder lever 27 and multifaceted cylinder 23 to rotate about axis 22. By energizing hydraulic piston 29, cylinder lever 27 and, correspondingly, piston actuated cylinder 26 are rotated about axis 22 at least 90 degrees. Thus, tree gripping and severing mechanism 15 (its functions to be fully described hereinafter) is rotated about axis 22 without the activation of any other mechanism.

Tree gripping and severing mechanism 15 (also see FIG. 4) is rotated about axis 22 an additional 90 degrees by means of second cylindrical bearing 35 connecting anchor cylinder 24 with tree gripping and severing head 36 by means of shaft 37. Torque to rotate tree gripping and severing head 36 about axis 22 is provided by second piston-cylinder arrangement 38. Said arrangement 38 is comprised of second hydraulic cylinder 39 and second hydraulic piston 40 with said second hydraulic piston 40 being rotatably connected to cylinder lever 27 by small shaft 41 and said hydraulic cylinder 39 being connected to head plate 42 by means of pin 43. Thus, as piston 40 slides in and out of hydraulic cylinder 39, tree gripping and severing mechanism 15 is rotated about axis 22 by means of second hydraulic bearing 35.

The 180 degree rotation of tree gripping and severing mechanism 15 can best be described as a two part system although both parts may act in tandem. Assuming that tree gripping and severing mechanism 15 is in a vertical position as shown in solid lines in FIG. 4, said mechanism 15 can be rotated clock-wise by the extension of hydraulic piston 29 from said hydraulic cylinder 30 to Position A (shown in dotted lines having hydraulic piston 29', hydraulic cylinder 30' and head plate 42' to assume a new position about axis 22). In this scenario, piston 40" does not change its position relative to cylinder 39'. To push base plate 42 counter-wise to Position B, piston 40 is withdrawn into cylinder 39 thus moving base plate 42 through an arc about axis 22 to a new position. Shown in dotted lines in FIG. 4, piston 40" has been withdrawn by hydraulic means into cylinder 39'". By actuating the hydraulic means of this two part system, base plate 42 and its attached tree gripping and severing mechanism 15 is rotated through an arc of 180 degrees about axis 22.

In reference to FIGS. 2, 3, 5 and 6, the relative parts and operation of tree gripping and severing mechanism 15 will be described. Structural integrity of the tree gripping and severing mechanism 15 is provided by backbone post 50 which is attached to said boom end 20 by means of head plate 42 and shaft 37 which is an integral part of multifaceted cylinder 23. An essential part of this invention is the construction and action of the pairs of tree gripping arms 52 and 52', 53 and 53 and 54 and 54'. Backbone post 50 is comprised of main support post 55 and tilting post 56 which is rotatably connected to main support post 55 by means of pin 57. All gripping arms 52, 52', 53, 53' and 54, 54' are either mounted on main support post 55 or tilting post 56 and their operation which is common to all gripping means is shown in FIG. 5.

Figures 4, 5:
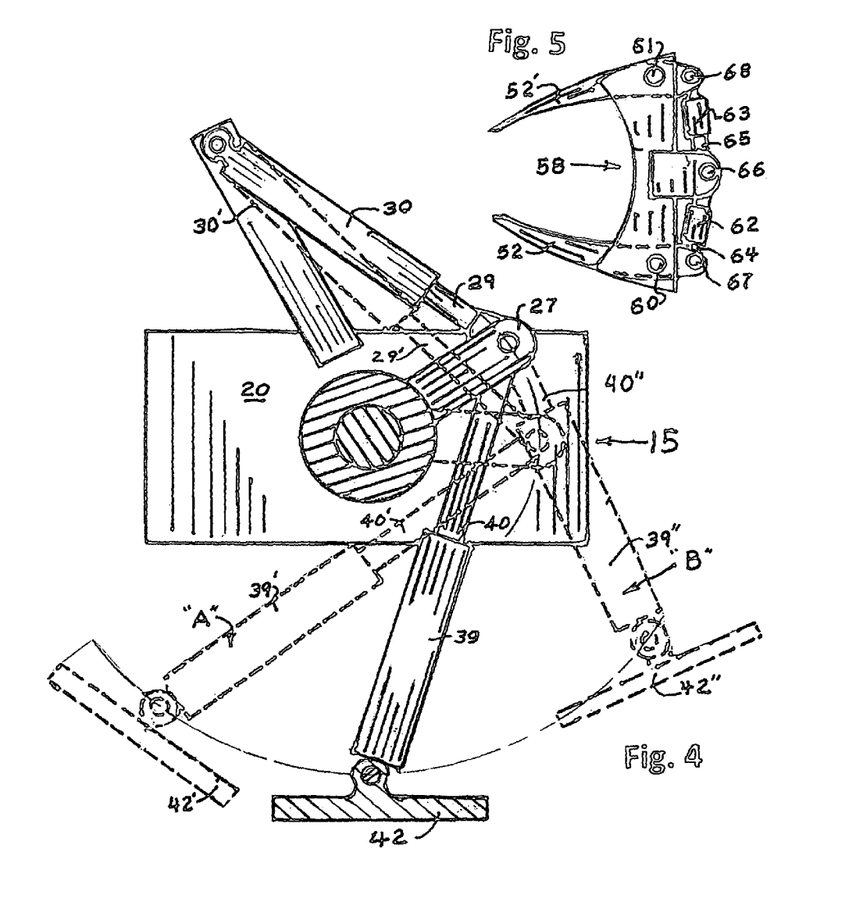
FIG. 4 is an enlarged sectional view taken through a portion of the tree harvesting apparatus along the line 4-4 of FIG. 2.
FIG. 5 is an enlarged, plan view of a portion of the tree gripping apparatus.
Figure 6:
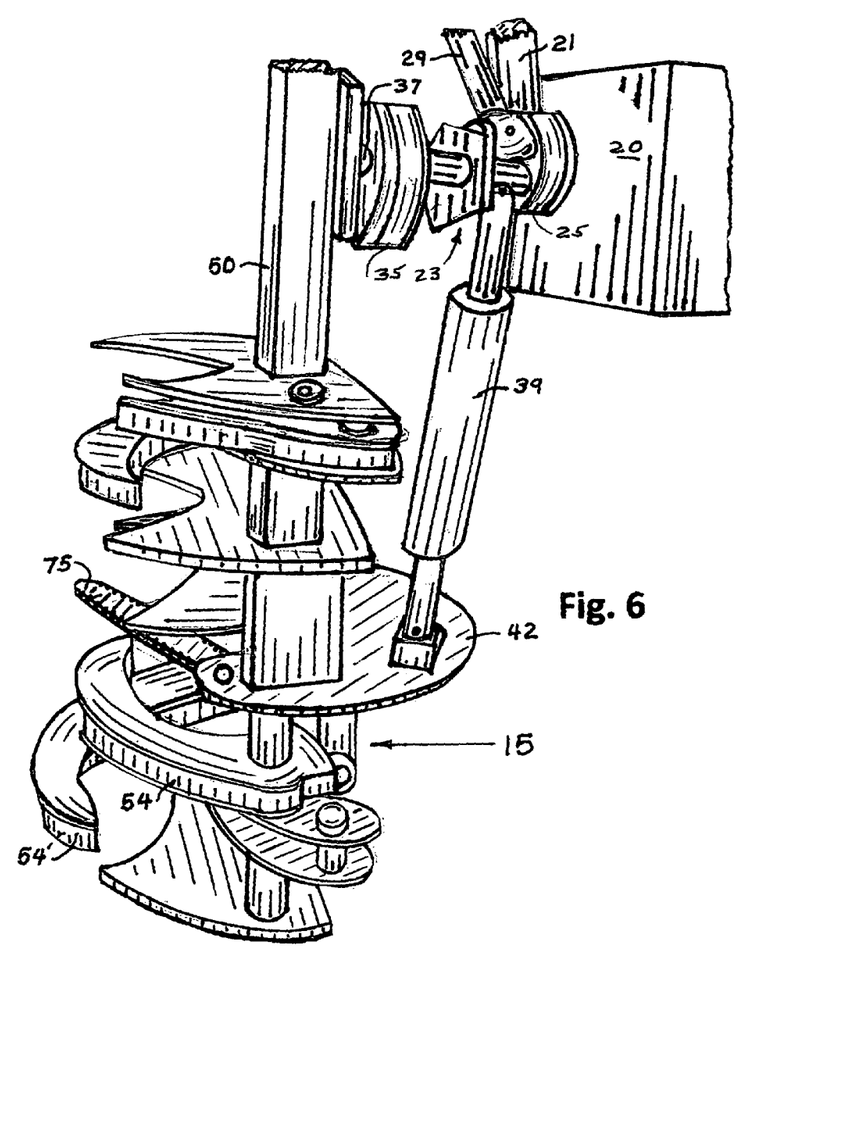
FIG. 6 is a partial perspective view of the tree gripping and severing mechanism being rotatably connected to the bearing mounted on the stationary boom end with the gripping arms contracted.
Figure 7:
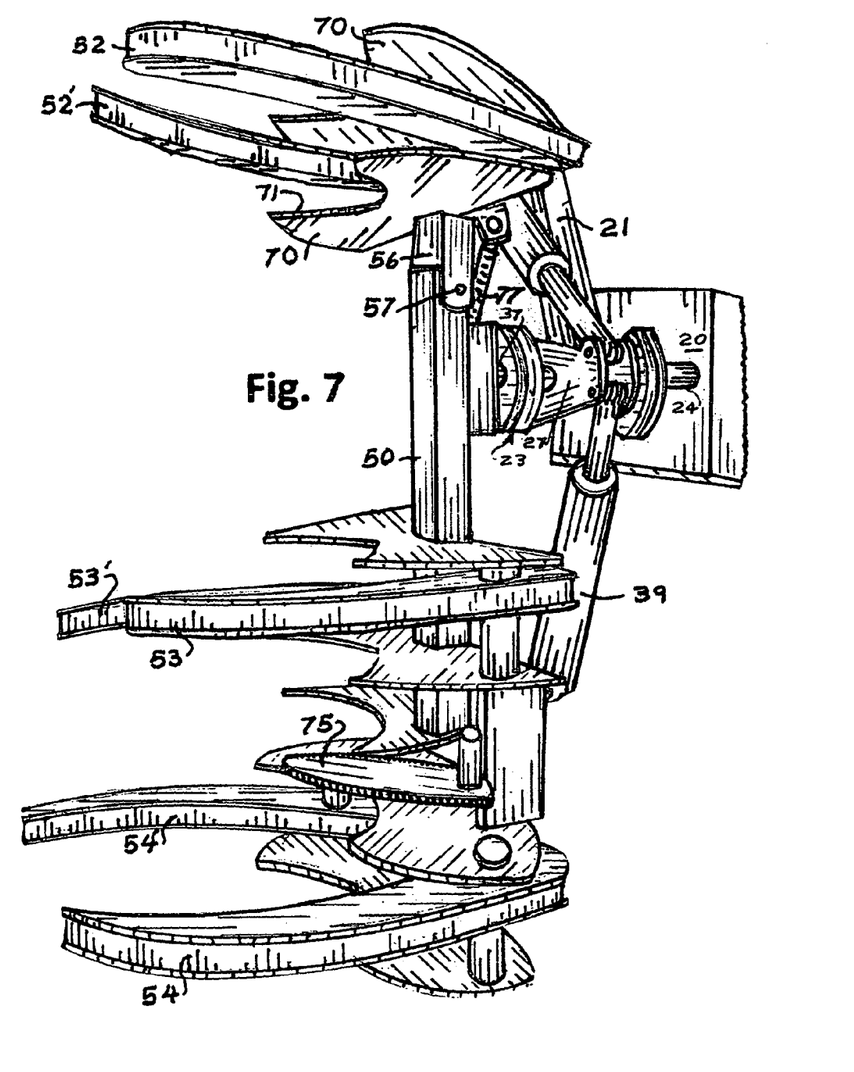
FIG. 7 is a perspective view of the tree gripping and severing apparatus showing the gripping arms extended and showing the hydraulic means connected to the cylinder lever for rotating the gripping and severing means about an axis.

In reference to FIGS. 5 and 7, tilting post 56 supports pincer mechanism 58 which includes gripping arms 52, 52' working on pivot pins 60 and 61 to engage free standing tree 9. Gripping arms 52, 52' are actuated by hydraulic cylinders 62 and 63, respectively, which have selected pistons 64 and 65 rotatably connected to tilting post 56 by means of pin 66. Pistons 64 and 65 are, in turn, connected to gripping arms 52, 52' by means of pins 67 and 68. Thus, upon the activation of hydraulic cylinders 62 and 63, pistons 64 and 65 respectively exert pressure on pins 67 and 68 which cause gripping arms 52, 52' to rotate about pivot pins 60 and 61, respectively, and force gripping arms 52, 52' inwardly into tree 9. Gripping arms 52, 52' engage and power tree 9 into beveled restraining plate 70 such that beveled edge 71 thereof slightly penetrates free standing tree 9 to the extent that cut tree bolt 72 cannot slip while being clinched by gripping arms 52 (52'). In practice, the three pincer mechanisms 58 operate in the same manner and are comprised of spaced apart beveled restraining plates 70 and 70' and gripping arms 52 and 52' which are rotatably mounted between said beveled restraining plates 70 and 70' to force said tree bolt into a binding relationship with said beveled restraining plates 70 and 70'.

The means for cutting free standing tree 9 into tree bolts 72 is of prime importance and is the ultimate object of this invention. Such cutting cannot be accomplished if saw blade 75 becomes bound in kerfs 76 while forming the same. In a normal logging operation, gravity and other forces may act on tree bolt 72 to impinge it onto saw blade 75 causing it to become bound within kerfs 76. In this invention, upper gripping arms 52, 52' clamp upon the upper section of tree bolt 72 while middle gripping arms 53, 53' firmly clamp upon the lower section of tree bolt 72. Simultaneously therewith, lower gripping arms 54, 54' securely engage free standing tree 9. Thus, prior to saw blade 75 passing through free standing tree 9 forming kerfs 76 and tree bolt 72, free standing tree 9 and tree bolt 72 were one and the same. With the various gripping arms securely clutching free standing tree 9 against backbone post 50, no movement of tree bolt 72 relative backbone post 50 or free standing tree 9 is possible upon saw blade 75 being passed through free standing tree 9 forming kerfs 76 and tree bolt 72.

Regardless if how tightly tree bolt 72 is clasped by the cooperating gripping arms, kerfs 76 will tend to close slightly after its formation and prevent a safe withdrawal of saw blade 75 from kerf 76. To provide for a nonbinding retraction of saw blade 75, tension inducing spring 77 is stretched across junction pin 57 and is attached by any means to tilting post 56 and backbone post 50, respectively. Thus, tension spring 77 minutely increases the width of kerf 76 to provide for an easy egress of saw blade 75 from kerf 76.

Having separated tree bolt 72 from free standing tree 9 by means of saw blade 75, tree bolt 72 (a tree top if that cut is the first cut) is weighed immediately by means of strain 79, the input signals of which being relayed to a computer (not shown) located on vehicle 10. If the weight of bolt 72 (or tree top) exceeds a prescribed limit, tree bolt 72 is released by Gripping arms 52, 52' and 53, 53' and allowed to free fall to the ground. If it is determined that tree bolt 72 has a dangerous weight at some location away from free standing tree 9 as taught by the prior art, the damage has already been done for the vehicle operator has no choice but to drop the tree bolt or tree top instantly or risk injury to himself and his vehicle. Thus, if the tree bolt happens to be above a dwelling or vehicles, the falling tree bolt will cause damage to whatever object lies in the drop zone beneath.

With reference to FIG. 8, an alternative kerf 76 maintaining mechanism is shown. The basic structure of tree gripping and severing mechanism 15 remains the same. All gripping arms 52, 52', 53, 53', 54 and 54' are mounted on their respective sections of backbone post 50. In this embodiment, backbone post 50 is comprised of tilting post 56 which is rotatably connected to main support post 55 by means of pin 57. The lower end of main support post 55 has been bifurcated to form swinging post 80 which is joined to main support post 55 by means of spring loaded shaft 81. Swing post 80 is free to oscillate about spring loaded shaft 81 when being lifted into position to engage free standing tree 9. To avoid unwanted movement during transportation from job to job, swinging post 80 is provided with lock pin 83 which is adapted to be removed prior to mounting tree gripping and severing mechanism 15 on free standing tree 9.

Gripping arms 54 and 54' are adapted to engage and force free standing tree 9 against swinging post 80 and into an immoveable position such that neither swinging post 80 not free standing tree 9 can move relative each other. At this stage, kerf 76 had yet to be formed and free standing tree 9 is a single and continuous entity throughout its length. Next, gripping arms 53 and 53' are actuated to engage and force free standing tree 9 against main support post 55 in a binding relationship. Lastly, tilting post 56 which is mounted on main support post 55 by means of pin 57 engages and squeezes free standing tree 9 against itself by means of gripping arms 52 and 52' regardless of the curvature of free standing tree 9. Thus, pincer mechanism 58 which includes tilting post 56 and attachments is adapted to rotate through arc X-X to accommodate any deformity in free standing tree 9. After securing gripping arms 52 through 54' about free standing tree 9, saw blade 75, which is mounted on main support post 55 above spring loaded shaft 81, is activated to cut a kerf 76 in free standing tree 9 thereby forming curved tree bolt 82.

Simultaneously with the passing of saw blade 75 through free standing tree 9, tree gripping and severing mechanism 15, which is connected to main support post 55 by means of shaft 37, is tilted slightly through arc Y-Y to maintain kerf 76 in an open and nonbinding position as saw blade 75 cuts through free standing tree 9 to form curved tree bolt 82. In summary, kerf 76 is maintained in a nonbinding position by pivoting main support post 55 slightly about spring loaded shaft 81 while swinging post 80 is maintained in a rigid position against free standing tree 9 by gripping arms 54 and 54'.

Harvesting a free standing tree according to this invention is normally preceded by stabilizing and leveling vehicle 10 by means of outriggers 14 followed by the delimbing of the tree by any common method. The steps of stabilizing and delimbing are followed by the steps of the method of this invention described as follows:

Step 1. Mounting a tree gripping and severing means to the free end of a telescoping boom extending outwardly from a vehicle.

Step 2. Rotating the tree gripping and severing means about an axis perpendicular to the boom end to place the tree gripping and severing means in alignment with the stem of the free standing tree.

Step 3. Attaching the tree gripping and severing means to a free standing tree at a desired location by means of upper, middle and lower pairs of axially aligned gripping arms.

Step 4. Securing the tree gripping and severing means to the free standing tree by activating the upper, middle and lower pairs of gripping arms to grasp the tree in a pincer like manner.

Step 5. Sculpturing a cut tree bolt from the free standing tree by passing a tree severing means through the free standing tree along a plane being perpendicular to that plane defined by the gripping arms and between the middle and lower pairs of gripping arms to form a kerf in the tree.

Step 6. Maintaining the kerf as defined by the cut tree bolt and the free standing tree.

Step 7. Weighing the cut tree bolt while being held by the upper and middle pairs of gripping arms and while the free standing tree being held by the lower pair of gripping arms in an immobile relationship.

The apparatus and method of this invention can be seen to be both versatile and adaptable to those situations in which weighing is required and necessary because of safety concerns.

What is claimed is:

1. A tree harvesting apparatus for cutting tree bolts from a selected free standing tree having a vertical axis, said apparatus including a crane carrying vehicle having an adjustably positioned and extentable boom mounted thereon, said boom including a boom end being adaptable to receive a tree gripping and severing mechanism, said mechanism comprising:
    a) A boom end post stationarily mounted on and extending radially outwardly from said boom end;
    b) A bearing mounted on said boom end being rotatable about an axis extending perpendicularly outward from said boom end;
    means for rotating said bearing connecting said boom end post with said bearing to rotate said bearing about said axis extending outwardly from said boom end;
    d) means for gripping and severing said tree stationarily mounted on said bearing and being rotatable therewith, said means for gripping and severing said tree comprising:
        i) a backbone post rigidly attached to said bearing and being rotatable therewith;
        ii) at least three pairs of tree gripping arms, upper, middle and lower, being mounted on said backbone post and being spaced along an axis common to each other and to said backbone post, said common axis adapted to be parallel with said vertical axis of said free standing tree;
        iii) severing blade mounted between said lower pair and said middle pair of said gripping arms;
    e) first actuating cylinder connected to said pairs of gripping arms and being remotely operable to cause said gripping arms to engage said free standing tree securely in at least three locations; and
    f) second actuating cylinder connected to said severing blade being adapted to direct said means for gripping and severing said tree against said free standing tree to cut a kerf in said free standing tree between said middle and said lower pairs of said gripping arms to form said tree bolt, said tree bolt being rigidly held by said upper pairs of gripping arms.

2. The tree harvesting apparatus as claimed in claim 1 wherein a means for weighing is spaced across said kerf to measure the weight of said tree bolt prior to any of said pairs of gripping arms releasing their respective grasps on said free standing tree and said tree bolt.

3. The tree harvesting apparatus as claimed in claim 1 wherein said upper pair of gripping arms exert a lateral force on said tree bolt to maintain said kerf in an open position.

4. The tree harvesting apparatus as claimed in claim 1 wherein said means for rotating said bearing is comprised of a first hydraulic cylinder arrangement connecting said backbone post to a hydraulic cylinder lever and a second hydraulic cylinder arrangement connecting said hydraulic cylinder lever to said backbone post, said first and second hydraulic cylinder arrangement being operable to rotate said backbone post through an arc of at least 180 degrees.

5. Tree harvesting apparatus for cutting tree bolts from a selected free standing tree having a vertical axis, said apparatus including a crane carrying vehicle having an adjustable and extendable boom mounted thereon, said boom having a boom end adapted to receive a tree gripping and severing mechanism, said mechanism comprising:
   a) a boom end post stationarily mounted on and extending radially outwardly from said boom end;
   b) a bearing mounted on said boom end and being rotatable about an axis extending perpendicularly outward from said boom end;
   c) means for rotating said bearing connecting said boom end post with said bearing to rotate said bearing about said axis extending outwardly from said boom end;
   d) means for gripping and severing said tree being rigidly mounted on said bearing and being rotatable therewith, said tree gripping and severing means comprising:
      i) a backbone post being comprised of a main support post rigidly attached to said bearing and rotatable therewith, a tilting post pivotably mounted on the upper end of said main support post and a swinging post pivotably mounted on the lower end of said main support post;
      ii) three axially aligned pairs of gripping arms respectively mounted on said tilting post, main support post and said swinging post, said pairs of gripping arms being actuated to grasp said free standing tree at three spaced apart locations;
      iii) means for cutting a kerf in said free standing tree to form a tree bolt being mounted on said main support post beneath said pair of gripping arms; and
   e) tension spring connected to said main support post being adapted to exert a lateral force on said main support post to maintain said kerf in a nonbinding position during the cutting of said kerf.

6. The tree harvesting apparatus as claimed in claim 5 wherein said gripping arms being mounted on said swinging post are adapted to be relaxed after said kerf is formed in said free standing tree to allow for said cut tree bolt to be removed.

7. The tree harvesting apparatus as claimed in claim 6 wherein said tilting post with said gripping arms mounted thereon being adapted to grasp said free standing tree having an irregular shape.

8. The tree harvesting apparatus as claimed in claim 6 wherein said swinging post and said gripping arms mounted thereon being adapted to be removed from said backbone post.

* * * * *